United States Patent
Carlson

[15] 3,644,663
[45] Feb. 22, 1972

[54] ELECTRICAL CONDUIT SYSTEM

[72] Inventor: Elmer T. Carlson, West Granby, Conn.
[73] Assignee: Broadhill Development Corporation, Granby, Conn.
[22] Filed: Oct. 14, 1970
[21] Appl. No.: 80,609

Related U.S. Application Data

[60] Division of Ser. No. 848,541, Aug. 8, 1969. Continuation-in-part of Ser. No. 769,485, Oct. 22, 1968, Pat. No. 3,504,097.

[52] U.S. Cl. ..................174/88 B, 174/16 B, 174/68 B, 174/99 B, 174/117 FF
[51] Int. Cl. ........................................................H01b 7/36
[58] Field of Search ................174/88 B, 99 B, 68 B, 68 C, 174/117 FF, 16 B

[56] References Cited

UNITED STATES PATENTS

| | | | |
|---|---|---|---|
| 2,200,776 | 5/1940 | Hoover | 174/117 FF X |
| 3,504,097 | 3/1970 | Carlson | 174/68 B |

*Primary Examiner*—Darrell L. Clay
*Attorney*—Jackson, Jackson & Chovanes

[57] ABSTRACT

A stack of insulated electrical conductors of rectangular external contour, each conductor preferably consisting of strip laminations, extends through a conduit which has an open position and a closed position in heat transfer relation with the insulation. Conduit envelopes are joined at the ends and conduits are suspended by hangers.

5 Claims, 12 Drawing Figures

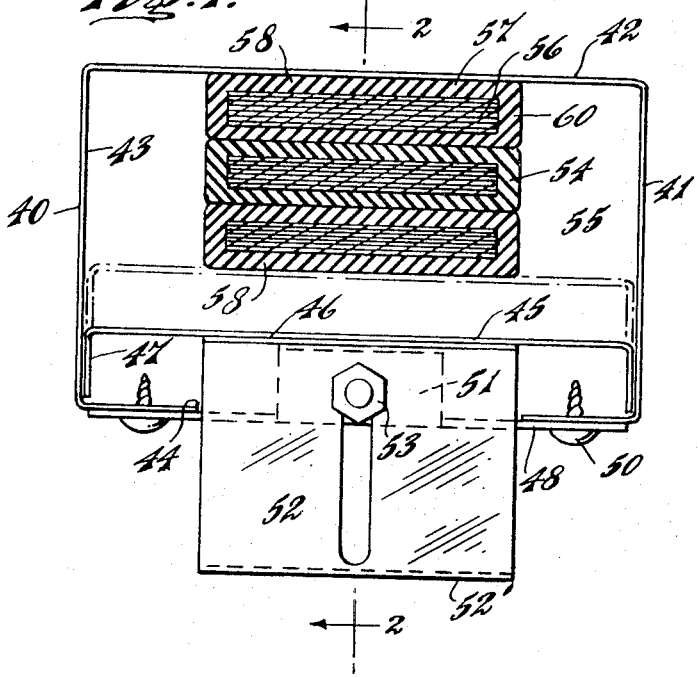
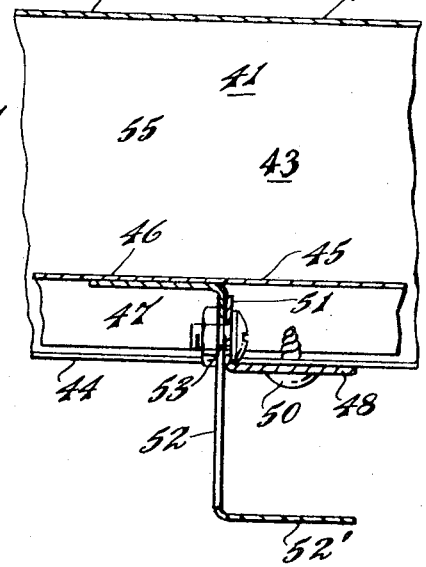
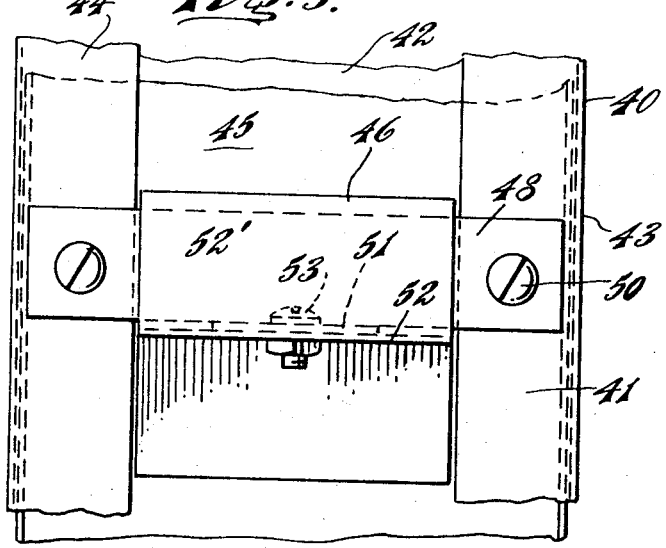

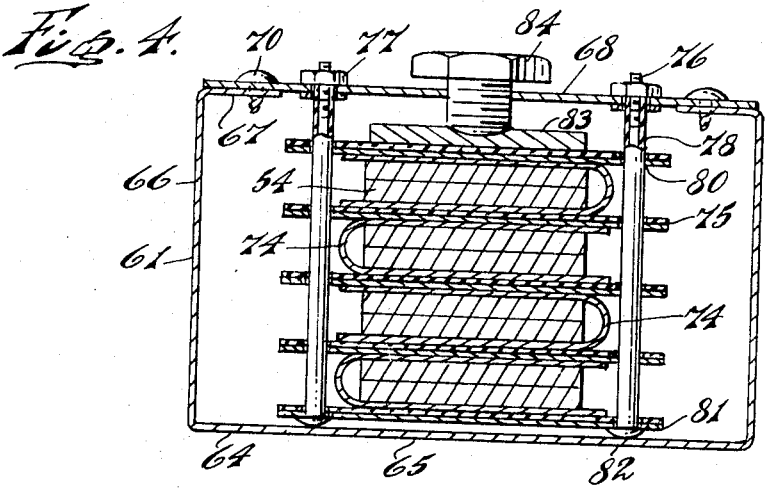
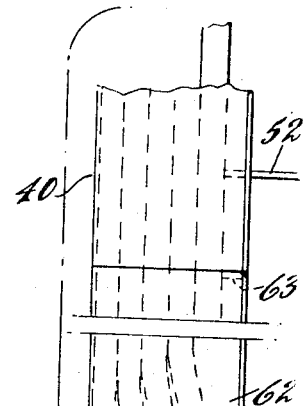
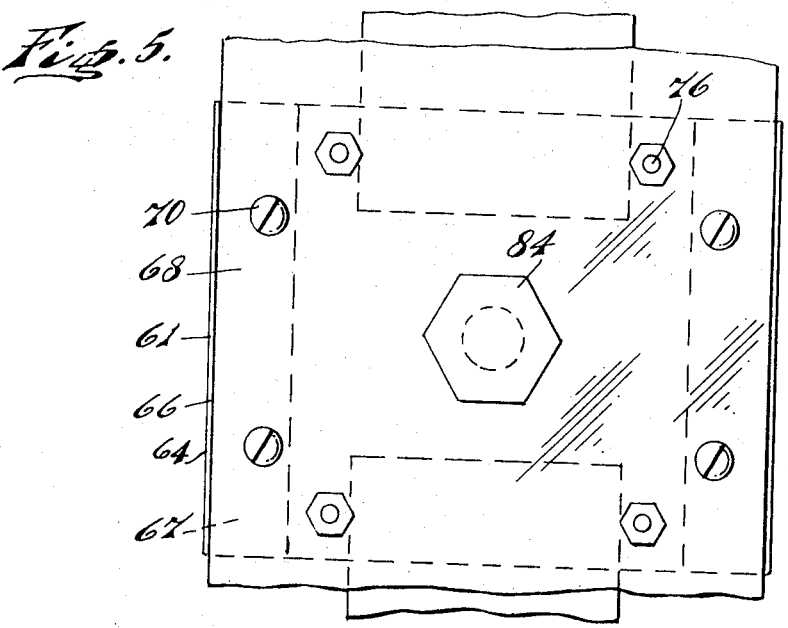
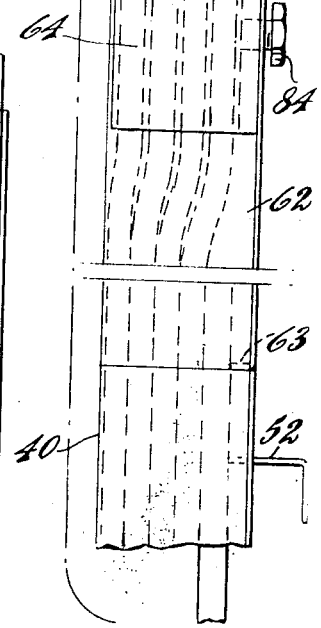
INVENTOR
ELMER T. CARLSON

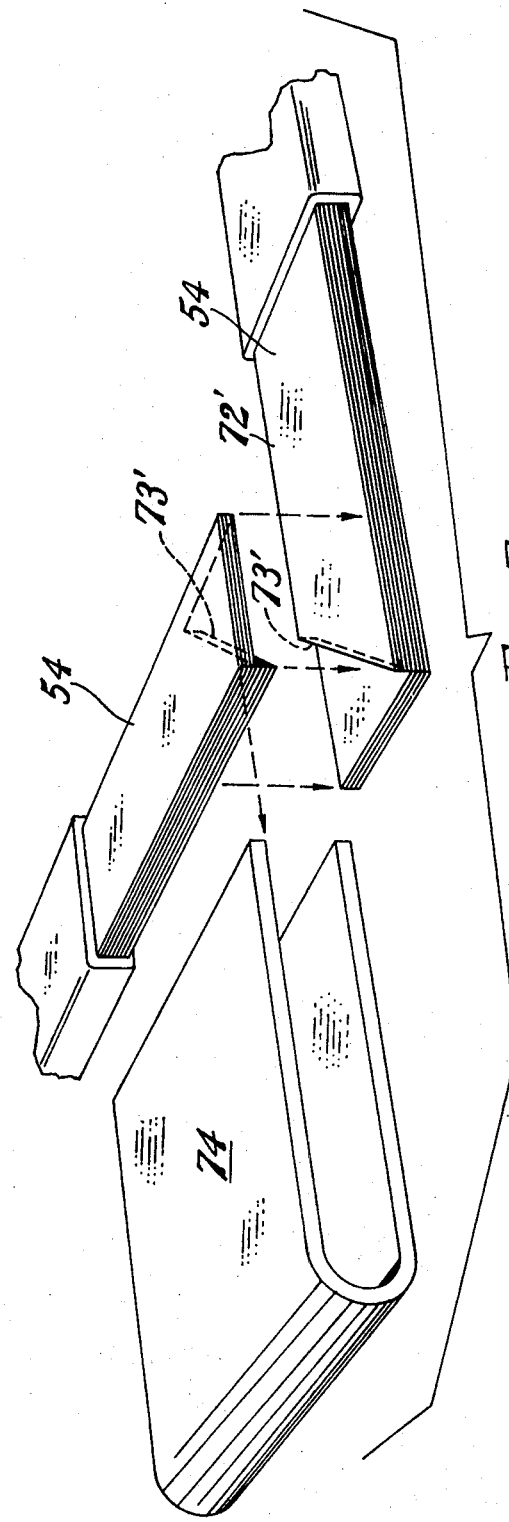
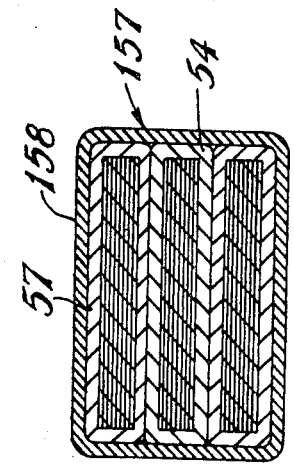
Fig. 10
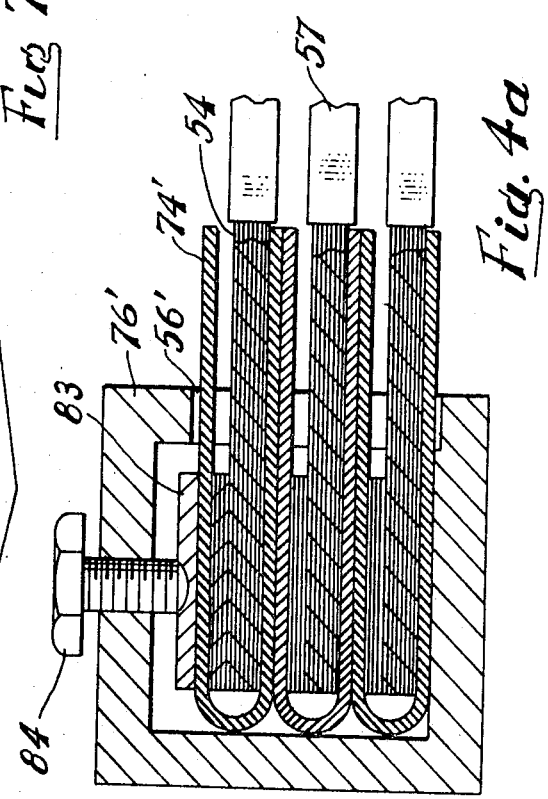
Fig. 4a
Fig. 7a
INVENTOR
ELMER T. CARLSON
BY
Jackson, Jackson and Chavanes
ATTORNEYS

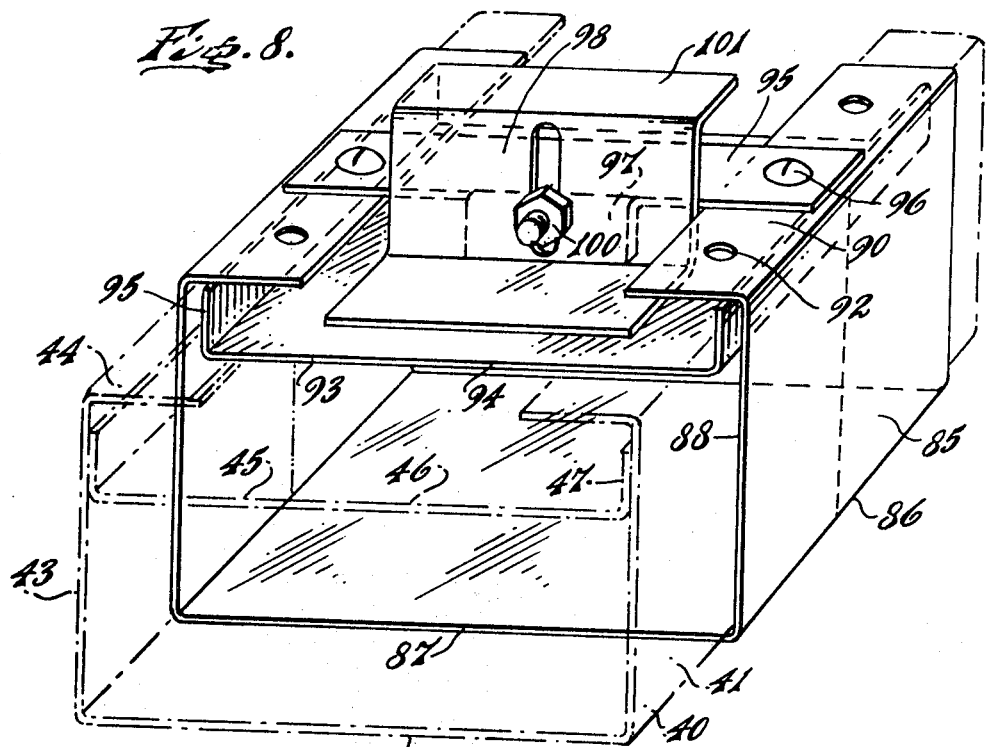
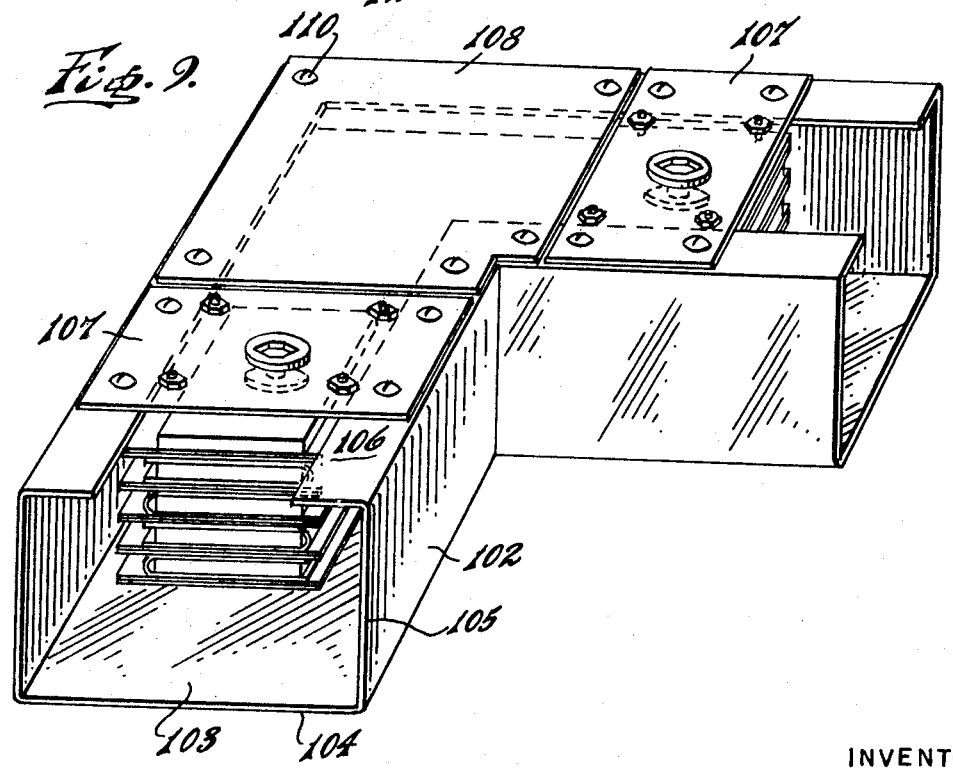
INVENTOR
ELMER T. CARLSON
BY Jackson, Jackson and Chovanes
ATTORNEYS 3,644,663

ELECTRICAL CONDUIT SYSTEM

The present application is a division of my copending application Ser. No. 848,541, filed Aug. 8, 1969 for Electrical Conduit System. Application Ser. No. 848,541 is a continuation-in-part of my copending application Ser. No. 769,485, filed Oct. 22, 1968 for Electrical Conduit, which is now U.S. Pat. No. 3,504,097. The application resulting in this patent is incorporated herein by reference.

The present invention relates to an electrical conduit system through which conductors of indefinite length can be carried and arranged in stacks, the conduit envelope aiding in heat dissipation.

A purpose of the invention is to provide an electrical distribution system of low cost for industrial plants, commercial installations and public buildings.

A further purpose is to provide a conduit in which the allowable current carrying capacity is comparable with that of insulated wires exposed to the air.

A further purpose is to secure a low impedance configuration of conductors made of strip laminations so as to reduce the voltage drop and permit smaller conductor cross section.

A further purpose is to eliminate conductor joints which would be required in busways, and require less space for an installation.

A further purpose is to reduce the need for special fittings in a conduit.

A further purpose is to provide for a stack or cable of conductors each consisting of laminations side by side and covered with insulation having opposite straight sides, a housing which closes off these straight sides and provides a dust proof enclosure.

Further purposes appear in the specification and in the claims.

FIG. 1 is a transverse section of a conduit of the invention, the cover being shown in open or expanded position for insertion of conductors and also in contracted position engaging a stack of conductors for improving heat transfer.

FIG. 2 is a fragmentary section of FIG. 1 on the line 2—2 omitting the conductors.

FIG. 3 is a fragmentary bottom plan view of FIG. 1.

FIG. 4 is a transverse section through a connector, in this case the stack of conductors being four high rather than three high as in FIG. 1.

FIG. 4a is a view similar to FIG. 4 showing a variation, with provision made for a right-angle connection.

FIG. 5 is a fragmentary top plan view of FIG. 4.

FIG. 6 is a fragmentary side elevation of a connector showing adapter portions which interconnect with ordinary conduit sections.

FIG. 7 is an enlarged side elevation showing the connection of a pair of conductors, one in prolongation of the other.

FIG. 7a is an exploded perspective of the connection of a pair of conductors at right angles to one another as in FIG. 4a.

FIG. 8 is a perspective of a union, showing in phantom two straight conduit sections extending into it from opposite ends.

FIG. 9 is a perspective of an angle connector according to the invention.

FIG. 10 is a diagrammatic cross section of a cable including several conductors which may be included in the conduit of the conductor.

In industrial plants, commercial installations and public buildings, distribution of electrical current has been accomplished by electrical wires or cables exposed to the air, busways, wireways, and other raceways. Busways are relatively expensive, involving rigid conductors, and connections made at the end of each section, usually every 10 feet. Many of the other systems involve making elaborate field measurements and providing a variety of special fittings often required to make the joints and connections.

The present invention is primarily concerned with an electrical conduit which obtains heat dissipation by improved heat transfer to the envelope, the conductors themselves being flexible in a plane transverse to the clamping faces of the envelope and conforming to the shape of the envelope, and being of relatively indefinite length so that comparatively few electrical connections need be made. Thus in a typical preferred installation according to the invention, the envelope may be of a length of the order of 10 feet, whereas the conductors may be a length of the order of 50 feet or 100 feet.

When the conductors are first threaded through the envelope, the envelope cover remains retracted so as to allow ample space, but after the conductors have been properly installed the cover is tightened so that good heat transfer is obtained with the conductor insulation at both sides of the stack. The width of the conductors is such that they cannot be inserted in the open conduit edgewise and must go in flatwise.

If the preferred embodiment of the invention, each of the conductors consists of a plurality of strip laminations which are relatively wide and thin and are arranged with their broad sides in engagement in a given conductor. The group of laminations of a given conductor are surrounded by insulation which has a rectangular external cross section. In the preferred embodiment, the broad sides of the insulation of the conductors are in contact in the stack. In the preferred form of the invention, the conductors may be surrounded by cable insulation.

Merely by way of example, for a 600-volt distribution three or four conductors will extend through the conduit. Each conductor preferably consists of four to twelve laminations, each lamination having a cross section of the order of 50,000 circular mils. Thus each conductor is likely to range between 200,000 and 600,000 circular mils in size.

The laminations are suitably of electrical grade aluminum or electrical grade copper, or a mixture of aluminum and copper. A convenient size for the laminations is approximately 2 inches wide and approximately 0.020 inch thick, so that the laminations bend freely in the direction of their thickness. With laminations of this size, the external side of the conduit can be approximately 4 by 2¾ inches in the preferred embodiment.

The insulation on each conductor preferably has a thickness of about 60 mils and may be of any suitable electrically insulating material, for example rubber, synthetic rubber such as neoprene, Teflon TFE (polytetrafluoroethylene) or National Electric Code Standard Insulation TWHN.

The preferred insulation according to the invention is a moisture and heat resistant cross-linked thermosetting polyethylene insulation of the type described in National Electric Code, Article 310, pages 70–94, XHHW of about 60 mils thick, permitting a permissible temperature rise to about 90° C. of a character sold by General Electric Company As Vulcene, by Kaiser Aluminum Corporation as Kathene and by General Cable Company as Genkene. Where the conductors are used as a cable, they will have an outer cable insulation, for example, of nylon.

The conductors used in the invention when of aluminum are preferably given a copper or bronze plate followed by 0.2 mils of tin plate, a preferred process being the Alstan process of Aluminum Company of America.

The sheet metal nonelectrically conducting parts of the invention are preferably of sheet aluminum, but they may be made of steel, stainless steel, magnesium, plastic or other suitable material.

Referring to FIGS. 1 to 3, an envelope 40 suitably made of sheet metal or the like consists of a first portion 41 of U shape having a base of the U 42, arms of the U 43, and opposite inwardly directed flanges 44 at the ends of the U. The envelope 40 has a second portion or cover 45 which telescopes within the first portion 41 and has a base of the U 46 and arms of the U 47 directed in the same direction as the arms 43 of the U 41. The cover is wide enough to make a tight but movable fit with the arms 43 of the U 41.

At several points along the length of the envelope bridges 48 extend across the otherwise open end of the first portion 41 of the envelope between the flanges 44 and are secured to these flanges by screws 50 or by welding. Suitably near the middle of each bridge there is an angle bracket 51 extending from the bridge toward the cover 45 and engaging a cooperating bracket 52 mounted on the cover and extending away from it, the two brackets having an adjustable slot and bolt connection as shown at 53. At the outer end the bracket 52 has a handle 52'.

With the cover open or in its full line position in FIG. 1, wires or conductors 54 are threaded through the duct space 55, there being ample room because the open position of the cover allows extra space. Each of the wires or conductors consists of a plurality of laminations 56 which are much wider than their thickness and are arranged with their broad sides in engagement. They will preferably be cabled together as described.

The group of laminations 56 making up each conductor is surrounded by insulation 57 which has in a cross section a broad side 58 and a narrow side 60. In the preferred embodiment, when the cover is closed, the broad side 58 of one conductor engages the base of the U 42 of the first portion of the envelope, and the broad side 58 of the insulation of another conductor engages the base of the U 46 of the cover. Thus very effective heat transfer is made to the envelope which aids in dissipating heat.

Assuming that each of the conductors shown in FIG. 1 corresponds to one phase of a three-phase distribution, it will be evident that this is a very low impedance configuration with the conductors closely and intimately spaced so as to reduce the voltage drop and permit the use of conductors of smaller cross section.

Since the conductors are long and have relatively few joints, there will be lower contact resistance, thus reducing the heat loss as compared to busways and conduit with wire. Also the space occupied is less than in a busway and the cost is lower. As will be seen, very few special fittings are required.

Straight sections of the envelope as shown in FIGS. 1 to 3 will extend indefinitely until the end of the conductors is reached. The straight sections will be joined by unions as later described. At the ends of the conductors a connector 61 is inserted as shown in FIGS. 4, 5 and 6, the connector being joined to straight envelopes 40 by adapter sections 62 (FIG. 6) extending into the ends of the connector and connecting with a straight section after the manner of the unions to be described. The adapter section has curtain flanges 63 which seal the space which otherwise would be provided within the U of the covers of the straight section.

The connectors 61 consists of a U shape first portion 64 having a base of the U 65 and arms 66 terminating in opposite inwardly directed flanges 67. A cover 68 is fixed to these flanges suitably by screw 70 or by welding. Each of the wires of conductors 54 is free from insulation 37 adjoining the ends (suitably 1½ inches back from the ends or more if required) and approximately half of the laminations of each conductor is allowed to extend as a long overlapping portion 71, FIG. 7, and the other half of the laminations on the side adjoining the other conductor are cut off short to make a short portion 72 of the other conductor as shown.

Each of the pair of exposed conductor ends forming a joint as shown in FIG. 7 is surrounded by a U-shaped sheet of instalation 74 shown in FIG. 4 and the bases of the U's of the alternate joints are arranged oppositely. Between the insulating sheets 74 are straight insulating sheets 75 also located at the top and bottom of the stack and extending laterally beyond the conductors. Bolts 76 are secured to the cover plate 68 by nuts 77 and these are insulated from the conductors by insulating sleeves 78 which pass through holes in the insulating sheets 75. At the opposite ends of the bolts a metallic press plate 81 is held by the bolt heads 82.

At the top of the stack, press plate 83 is urged toward the press plate 81 by a screw 84 threaded through the cover 68 and conveniently making a rotatably nonremovable fit with the press plate 83 if desired.

In FIGS. 4a and 7a, I show a modified and preferred form of connector having a press body 76' provided with a window 76² on either side or straight head, of rectangular form suitably of cast metal and a compression screw 84 acting on a stack of laminated conductors separated by insulation 74'. While the conductors here are at right angles, they can be arranged straight ahead by cutting one short group of laminations on the opposite diagram.

Where a smaller number of conductors are being used, insulating filler blocks can be inserted in the press.

In some cases as shown in FIG. 7a, the short laminations 72' may have diagonal or angular end cuts 74'. Thus as two conductors are joined endwise, the diagonal portions abut as shown in FIG. 7a to extend in prolongation of one another, but shown in FIG. 7a if they are to extend out in right angles one conductor is moved into right-angle relation with respect to the other conductor so that in either case the short laminations abut one another and the longer laminations extend over and make electrical contact with the sides of the short laminations of the other conductor. It will be evident that the body of the press as shown in FIG. 4a may permit right-angle connections at 56' in either direction.

It will be evident that the joint design shown permits making effective joints in bare or insulated conductors having two or more flat laminations which will engage face to face under considerable pressure without requiring drilling holes in the conductors to insert bolts or the like.

It will furthermore be evident that the system of the invention provides joint areas which are substantially greater than the cross section of the laminated conductors themselves thus reducing voltage drop at the joints and reducing heating at the joints.

It will further be evident that the face to face contact areas of the laminations at the joints are substantially equivalent to the overlapping areas of two solid overlapping bus bars, thus keeping down joint resistance and localized heating.

It will furthermore be evident that the diagonal or angular cut of the abutting ends of the shorter laminations makes it possible to join conductors optionally in straight line relation or at 90° to the right or left, cutting the diagonal as required.

It will further be evident that the thickness of the joint of laminated conductors is substantially less than the thickness of two overlapping face to face bus bars making a joint, resulting in greater compactness.

It is further evident that the overlapping lamination 54' are visible between the insulation separators 74' to ascertain their proper operating position.

It is further evident that the overlapping laminations of each conductor joint can be individually secured together by conventional means of welding, riveting or bolting.

Any two straight envelope sections are joined together end to end as shown in FIG. 8 by a union 85 which resembles the straight envelope section shown in FIGS. 1 to 3 and receives the ends of the straight envelope section within the union. The union 85 has a first envelope section 86 of U-shape having a base of the U 87, arms of the U 88 and oppositely directed inward flanges 90 at the ends of the U. The first envelope portion 41 of the straight envelope fits exactly within this and extends to the middle of the union and is held by screws 92 extending through flanges 90 of the union and flanges 44 of the envelope section.

A second portion or cover 93 of the union is of U-shape and has a base of the U 94 and arms of the U 95 extending in the same direction as the arms of the U 88 of the first portion 86 of the union, the cover 93 telescoping within the first portion 86 of the union with sufficient clearance so that the cover 45 of the envelope can surround the cover 93 of the union.

The inwardly directed flanges 90 of the union are spanned at the center by a bridge 95 secured by screws 96 and having an inwardly directed bracket 97 which cooperates with and engages against an outwardly directed bracket 98 from the union cover 93, the cover being anchored in any adjustment position by a bolt and slot combination 100 acting between the brackets 97 and 98. A handle 101 is provided at the outer end of the bracket 98.

Suitable angle connectors, branch connectors, crossovers and tees are provided following the general scheme of FIG. 9 or using the preferred arrangement of FIG. 4a. An angle housing 102 has a first portion 103 of U-shape form provided with a base of the U 104, arms of U 105 and opposite inwardly directed flanges 106 at the ends of the U. Connectors 107 as shown in FIGS. 4 and 5 are mounted at opposite ends in the angle housing 102, the wires or conductors being clamped in these connectors as previously described. A cover plate 108 covers the remaining portion of the angle connector, being secured to the flanges 106 by screws 110. At the adjoining ends the straight envelope sections extend into the angle connector housing and are suitably secured thereto as by screws in the manner described in connection with FIG. 8.

In FIG. 10 a cable 157 is shown having a cable insulator or jacket 158 surrounding conductors of the character shown for example in FIGS. 1 and 4 so that all conductors can be introduced in the envelope at one time, rather than introducing separate conductors. It is believed that the cable embodiment will be the preferred form of the invention.

In normal operation, first the hangers will be installed, and then a succession of straight envelope sections joined by unions, are provided, with angle connectors where required, and with straight line connectors at positions where conductors will terminate. With the covers expanded or opened in the envelopes, the ends of the conductors are extended into the disassembled connectors between the insulation layers. Then the press is tightened. When the wiring in a particular area has been completed, all of the covers are closed until the top and bottom of the stack of conductors or the cable are in firm engagement with the envelope to promote intimate heat transfer. It will be noted that the cover plates of the envelopes can be closed without interference by the hangers.

If it is desired later to change the installation, in many cases the covers can be loosened by loosening the locking screws and arrangements can be made to insert an additional conductor or conductors in the same envelope and then to again tighten the covers on the stack. If desired the conductors can be removed and reinstalled. These same favorable conditions result with copper conductors.

The conduit sections can preferably be shipped with covers closed to minimize the space requirement and then the covers can be opened at the time of installation.

The following table shows a comparison of the ampere ratings at 600 volts three-phase 60-cycle AC systems for utilization of various sizes of wires in conduits according to the invention, as compared to similar aluminum insulated wire exposed to the air and similar insulated wires in prior art conduits. It will be noted that the results obtained by the invention are favorable.

COMPARISON OF CONDUIT OF INVENTION WITH NATIONAL ELECTRIC CODE RATINGS

[In amperes]

| Circular mils, thousands | Insulated Al conductors, single in free air | | Insulated Al conductors, 3 in conduit XHHW | Conduit of invention, Al laminations, calculated |
|---|---|---|---|---|
| | Dry XHHW | Wet THWN | | |
| 200 | 300 | 280 | 185 | 300 |
| 250 | 330 | 315 | 215 | |
| 300 | 375 | 350 | 240 | 350 |
| 350 | 415 | 395 | 260 | |
| 400 | 450 | 425 | 290 | 400 |
| 500 | 515 | 485 | 330 | 500 |
| 600 | 585 | 545 | 370 | 600 |

In view of my invention and disclosure, variations and modifications to meet individual whim or particular need will doubtless become evident to others skilled in the art, to obtain all or part of the benefits of my invention without copying the electrical conduit system shown, and I therefore claim all such insofar as they fall within the reasonable spirit and scope of my claims.

Having thus described my invention what I claim as new and desire to secure by Letters Patent is:

1. In an electrical conduit, a stack or cable of conductors of rectangular cross section each including a plurality of flexible electrically conducting strip laminations arranged side by side and surrounded by insulation externally of rectangular cross section, broad faces of the insulation of the conductors being in contact, an envelope surrounding the stack or cable of conductors and including relatively laterally telescoping walls, and fastening means distributed along the envelope and in one position holding the walls of the envelope in firm heat transfer contact with flat walls of the stack or cable.

2. An electrical conduit of claim 1, in which the envelope has a first portion of U-shaped cross section, and a second portion of U-shaped cross section telescoping within the first portion.

3. An electrical conduit of claim 2, in which the fastening means comprised bridges across the open end of the U of the first portion of the envelope, the bridges having first brackets extending in the direction toward the base of the U-shaped cross section, second brackets on the second portion extending in the same direction as the first brackets and adjoining the same, and bolt and slot fastenings between the first and second brackets.

4. An electrical conduit of claim 3, in which there are inwardly extending flanges on the ends of the arms of the U of the first portion of the envelope, on which the bridges are mounted.

5. In an electrical conduit, an envelope for receiving electrical conductors comprising a first envelope portion of U-shaped cross section, a second envelope portion of U-shaped cross section telescoping within the U of the first envelope portion, the arms of the U's extending in the same direction, means for clamping the first and second envelope portions in adjusted position, a third envelope portion of U-shaped cross section, a fourth envelope portion of U-shaped cross section telescoping within the U of the third envelope portion, the arms of the U's of the third and fourth envelope portions extending in the same direction, means for clamping the third and fourth envelope portions in adjusted position, the third and fourth envelope portions meeting the first and second envelope portions at a union, a longitudinal union for the envelope portions comprising a first union portion of U-shaped cross section surrounding the first envelope portion at one end and the third envelope portion at an adjoining end, a second union portion of U-shaped cross section telescoping within the first union portion and having arms of the U directed in the same direction as the arms of the U of the first union portion, the second and fourth envelope portions telescoping with respect to the second union portion at adjoining ends, the first and third envelope portions fitting within the first union portion at adjoining ends, means for clamping the second union portion with respect to the first union portion in adjusted position, and means to fasten the first envelope portion and the third envelope portion to the first union portion.

* * * * *